Sept. 17, 1940.    J. E. OWEN    2,215,297
SEISMIC SURVEYING
Filed Feb. 16, 1940
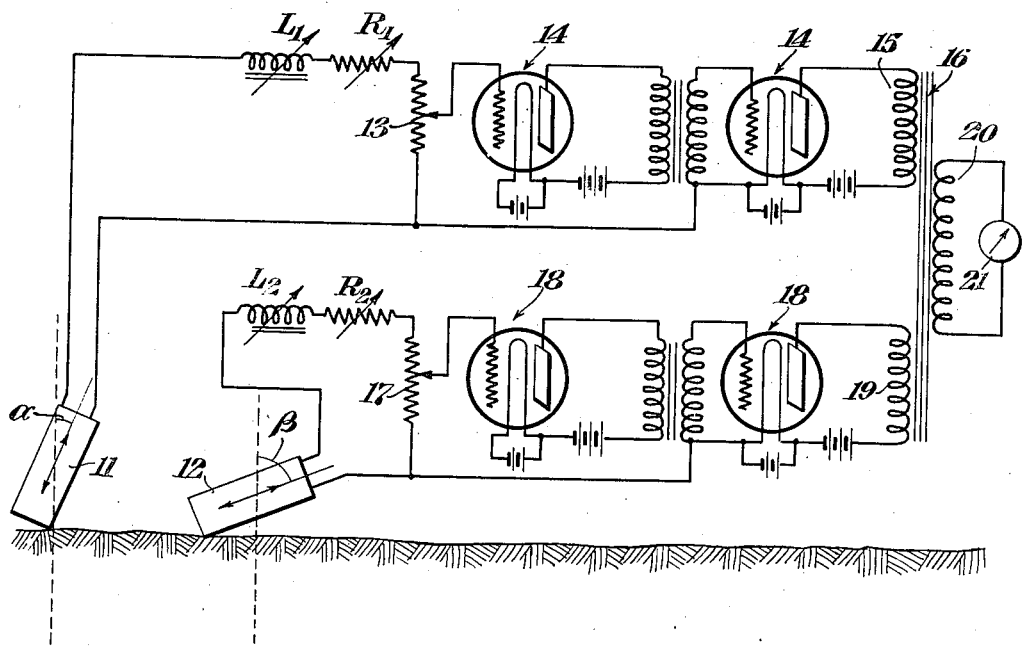
INVENTOR
John E. Owen
BY
Kenyon & Kenyon
ATTORNEYS Patented Sept. 17, 1940

2,215,297

UNITED STATES PATENT OFFICE 2,215,297

SEISMIC SURVEYING

John E. Owen, Tulsa, Okla., assignor to Geophysical Research Corporation, New York, N. Y., a corporation of New Jersey Application February 16, 1940, Serial No. 319,260

15 Claims. (Cl. 181—0.5)

This invention relates to seismic surveying.

In the reflection wave method of seismic surveying, as heretofore practiced, the reflection wave record has been complicated by the effects produced by surface waves generated at the explosion of the shot. Such surface waves are the waves commonly known as ground roll which are of large amplitude and low frequency and travel out from the shot point along the surface of the earth. These waves are closely analogous to the surface waves known as "Rayleigh" waves which are a well-known type of wave produced as a result of natural earth quakes. The earth particles executing the ground roll traverse an elliptical path and the motion of a particle is retrograde with respect to the direction of propagation of the wave.

An object of this invention is to eliminate the objectionable effects of the surface waves from a reflection record.

Usually, the major axis of the ground roll elliptical path is vertical, but in some instances it may be inclined to the vertical by an angle $\lambda$ of small magnitude. The displacement of an earth particle in the direction of said major and minor axes may be represented by $$z = A \sin \omega t$$

and $$x = B \cos \omega t$$

where

A = the amplitude of earth motion along the major axis.
B = the amplitude of the earth motion along the minor axis.
$x$ = displacement in the direction of the minor axis at the time $t$.
$z$ = displacement in the direction of the major axis at the time $t$.
$\omega = 2\pi f$ where $f$ = frequency of motion in cycles per second.

According to the present invention, two electrical geophones are arranged at the recording station so close together that the movement thereof is substantially unitary. The two geophones are arranged with their axes in a vertical plane passing through the shot point and recording position in any angular relation to the earth surface. The response of the first geophone to ground roll motion may be expressed as follows:

$$G_1 = A \cos (\lambda - \alpha) \sin \omega t - B \sin (\lambda - \alpha) \cos \omega t$$

where $\alpha$ is the angle of said geophone to vertical and the response of the second geophone may be expressed as follows:

$$G_2 = A \cos (\lambda - \beta) \sin \omega t - B \sin (\lambda - \beta) \cos \omega t$$

where $\beta$ is the angle of said second geophone to vertical. These expressions can be written $$G_1 = N_1 \sin (\omega t - \phi)$$

$$\tan \phi = \frac{B}{A} \tan (\lambda - \alpha)$$

where $$G_2 = N_2 \sin (\omega t - x)$$

$$\tan x = \frac{B}{A} \tan (\lambda - \beta)$$

In one form of apparatus for practicing the invention, the output of each geophone is connected to a phase shifting network which in turn is connected through a vacuum tube amplifier to the input of a recorder so that the recorder is simultaneously influenced by the outputs of the two geophones. The effects of the ground roll are cancelled out by amplifying the output of the first geophone by a factor $k_1$ and the output of the second geophone by a factor $k_2$ so chosen as to make $k_1 N_1 = k_2 N_2$ and shifting the phase of the second geophone output by the amount $(x - \phi)$ or the output of the first geophone by the amount $(\phi - x)$ and impressing the altered outputs on the recorder 180° out of phase. With the output of the second geophone shifted in phase by $(x - \phi)$ the following equation results:

$$k_1 N_1 \sin (\omega t - \phi) - k_2 N_2 \sin (\omega t - x + x - \phi) = 0$$

and with the output of the first geophone shifted by $(\phi - x)$, the following equation is obtained:

$$k_1 N_1 \sin (\omega t - \phi + \phi - x) - k_2 N_2 \sin (\omega t - x) = 0$$

The ground roll effects of the earth motion are thus completely eliminated by proper phase shifting and amplification and the recorder will produce a trace only of the reflected waves.

In general, the reflected waves arrive nearly vertical at the surface and, therefore, introduce only a vertical component into the earth motion which may be represented by $$R \cos (\omega_1 t + \eta)$$

The response of the first geophone to this motion may be expressed as follows:

$$G_1 = R \cos \alpha \cos (\omega_1 t + \eta)$$

and the response of the second geophone may be expressed as follows:

$$G_2 = R \cos \beta \cos (\omega_1 t + \eta)$$

After amplifying the outputs, shifting the phase of the second geophone and combining the outputs to eliminate the ground roll, the expression for the combined reflection wave outputs of the two geophones is $$k_1 R \cos \alpha \cos (\omega_1 t + \eta) - k_2 R \cos \beta \cos [\omega_1 t + \eta + x - \phi]$$

or $$k_1 R \left\{ \left[ \cos \alpha - \frac{k_2}{k_1} \cos \beta \cos (x-\phi) \right] \cos (\omega_1 t + \eta) + \frac{k_2}{k_1} \cos \beta \sin (x-\phi) \sin (\omega_1 t + \eta) \right\}$$

which can be written $$R_1 \cos (\omega_1 t + \eta + \alpha)$$

where $$\tan \alpha = \frac{-\dfrac{k_2}{k_1} \cos \beta \sin (x-\phi)}{\cos \alpha - \dfrac{k_2}{k_1} \cos \beta \cos (x-\phi)}$$

and $$R_1 = k_1 R \sqrt{\left[ \cos \alpha - \frac{k_2}{k_1} \cos \beta \cos (x-\phi) \right]^2 + \left(\frac{k_2}{k_1}\right)^2 \cos^2 \beta \sin^2 (x-\phi)}$$

The last expression shows that the combined reflected wave outputs will be recorded with a phase shift but with a finite amplitude. As in ordinary ground roll, the major axis of the ellipse representing the ground motion is nearly or actually vertical, the foregoing equations may be simplified by making λ equal 0. Also, the foregoing equations can be simplified by arranging one geophone so that it is responsive only to the vertical component of the ground roll and the other geophone so that it is responsive only to the horizontal component of the ground roll. With vertical and horizontal arrangement of the geophones and a vertical major axis of the ground roll ellipse, the response of the geophones to the ground roll may be expressed as follows:

$$G_1 = B \cos \omega t$$

and $$G_2 = A \sin \omega t$$

By shifting the phase of output of the first geophone 90°

$$G_2 = A \cos \omega t$$

and the effects of the ground roll are eliminated by equalizing the amplitude of the two outputs and impressing them on the record 180° out of phase.

Other objects, novel features and advantages of this invention will become apparent from the following specification and accompanying drawing, wherein the single figure is a diagrammatic illustration of apparatus for practicing the invention.

Two geophones 11 and 12 are provided at the receiving station with their axes in a vertical plane passing through the shot point and the recording position. The axis of the geophone 11 is at an angle to the vertical equal to α and the axis of the geophone 12 is at an angle to the vertical equal to β. In the special case where the geophone 11 is vertical and the geophone 12 horizontal, the angles α and β are respectively 0° and 90°. The output of the geophone 11 is connected through a voltage divider 13 across the input of a multiple stage vacuum tube amplifier 14. The output circuit of the amplifier 14 includes a winding 15 which constitutes one part of the primary of a transformer 16. The geophone 12 is connected through a voltage divider 17 across the input of a multi-stage vacuum tube amplifier 18. The output circuit of the amplifier 18 includes a winding 19 which constitutes the second part of the primary of the transformer 16. The secondary winding 20 of the transformer 16 is connected to a recording galvanometer 21 of the type which makes but a single trace. In the output circuit of the geophone 11 is included a phase shifting network consisting of the inductance $L_1$ and the resistance $R_1$ and in the output circuit of the geophone 12 is included a phase shifting network consisting of the inductance $L_2$ and the resistance $R_2$.

The geophones 11 and 12 convert two different ground roll components into electrical waves and also two different components of the reflected wave. One or both phase shifting networks are adjusted to impress the outputs of the two geophones on the recorder with the surface wave components thereof 180° out of phase and the amplifiers are adjusted to equalize the amplitudes of the surface wave components of the two outputs. The effects of the ground roll are cancelled out and the recorder influenced only by the reflected wave components. The resulting trace is, therefore, a true representation of the reflected wave.

The phase shifting network herein disclosed is merely illustrative and other types of network may be used. Such network is adapted primarily to produce the proper phase shift for a single frequency of ground roll which is usually sufficient as most of the ground roll energy is in a narrow band of frequency. Should it be desirable to effect phase shifting of a wide band of frequencies, suitable modification of the network for this purpose is contemplated. The operation of the method, however, will be the same as above described and will fall within the scope of the appended claims.

I claim:

1. The method of seismic surveying which comprises creating a source of seismic waves at the earth's surface, separately detecting two angularly related components of the resulting earth motion at a point on the earth's surface, said earth motion being the resultant of motions produced by surface waves, by refracted waves and by reflected waves, converting each of said detected earth motion components into a corresponding electrical wave, adjusting said electrical waves to bring the surface wave components thereof into proper relationship substantially to cancel each other when combined, combining the adjusted electrical waves, and recording the resulting wave form.

2. The method according to claim 1 characterized by detection of other than vertical and horizontal earth motion components.

3. The method according to claim 1 characterized by detection of earth motion components having an angular relationship other than 90°.

4. The method of seismic surveying which comprises creating a source of seismic waves at the earth's surface, separately detecting two angularly related components of the resulting earth motion at a point on the earth's surface, said earth motion being the resultant of motions produced by surface waves, by refracted waves and by reflected waves, converting each of said detected earth motion components into a corresponding electrical wave, shifting the phase relation of the surface wave components of said electrical waves to zero phase relation, adjusting said electrical waves to equalize the amplitude of the surface wave components thereof, combining the adjusted electrical waves with their surface wave components 180° out of phase and recording the resultant wave form.

5. The method according to claim 4 characterized by detection of earth motion components other than vertical and horizontal.

6. The method according to claim 4 characterized by detection of earth motion components having an angular relationship other than 90°.

7. The method of seismic surveying which comprises creating a source of seismic waves at the earth's surface, separately detecting two angularly related components of the resulting earth motion at a point on the earth's surface, said earth motion being the resultant of motions produced by surface waves, by refracted waves and by reflected waves, converting each of said detected earth motion components into a corresponding electrical wave, shifting the phase of one electrical wave to bring its surface wave components into zero phase relation with the surface wave component of the other electrical wave, adjusting said electrical waves to equalize the amplitude of the surface wave components thereof, combining the adjusted electrical waves with the surface wave components thereof 180° out of phase and recording the resultant wave form.

8. The method according to claim 7 characterized by detection of other than vertical and horizontal earth motion components.

9. The method according to claim 7 characterized by detection of earth motion components having an angular relationship other than 90°.

10. The method of seismic surveying which comprises creating a source of seismic waves at the earth's surface, separately detecting two angularly related components of the resulting earth motion at a point on the earth's surface, said earth motion being the resultant of motions produced by surface waves, by refracted waves and by reflected waves, converting each of said detected earth motion components into a corresponding electrical wave, adjusting said electrical waves to make the surface wave component of one electrical wave equal in amplitude to but 180° out of phase with the surface wave component of the other electrical wave, combining the adjusted electrical waves and recording the resultant wave form.

11. The method according to claim 10 characterized by detection of earth motion components other than vertical and horizontal.

12. The method according to claim 10 characterized by detection of earth motion components having an angular relationship other than 90°.

13. The method of seismic surveying which comprises creating a source of seismic waves at the earth's surface, separately detecting two angularly related components of the resulting earth motion at a point on the earth's surface, said earth motion being the resultant of motions produced by surface waves, by refracted waves and by reflected waves, converting each of said detected earth motion components into a corresponding electrical wave, adjusting said electrical waves to equalize the amplitude of the surface wave components thereof, combining said adjusted electrical waves with the surface wave components thereof 180° out of phase, and recording the resultant wave form.

14. The method according to claim 13 characterized by the detection of earth motion components other than vertical and horizontal.

15. The method according to claim 13 characterized by detection of earth motion components having an angular relationship other than 90°.

JOHN E. OWEN.